US012153513B2

United States Patent
House, Jr.

(10) Patent No.: US 12,153,513 B2
(45) Date of Patent: *Nov. 26, 2024

(54) TECHNIQUES FOR CONFORMANCE TESTING COMPUTATIONAL OPERATIONS

(71) Applicant: Microsoft Technology Licensing, LLC, Redmond, WA (US)

(72) Inventor: Barton Robert House, Jr., Fall City, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,205

(22) Filed: Jun. 5, 2023

(65) Prior Publication Data

US 2023/0393969 A1 Dec. 7, 2023

Related U.S. Application Data

(63) Continuation of application No. 16/523,732, filed on Jul. 26, 2019, now Pat. No. 11,704,231.

(51) Int. Cl.
| G06F 7/00 | (2006.01) |
| G06F 11/36 | (2006.01) |
| G06F 17/15 | (2006.01) |
| G06N 20/00 | (2019.01) |
| G06T 1/20 | (2006.01) |
| G06F 7/483 | (2006.01) |

(52) U.S. Cl.
 CPC ...... *G06F 11/3688* (2013.01); *G06F 11/3692* (2013.01); *G06F 17/15* (2013.01); *G06N 20/00* (2019.01); *G06T 1/20* (2013.01); *G06F 7/483* (2013.01)

(58) Field of Classification Search
 CPC ......... G06N 20/00; G06F 17/15; G06F 7/483; G06T 1/20
 See application file for complete search history.

(56) References Cited

U.S. PATENT DOCUMENTS

2022/0327656 A1* 10/2022 Mellempudi ......... G06F 7/5443

OTHER PUBLICATIONS

"Notice of Allowance Issued in European Patent Application No. 20751339.1", Mailed Date: Aug. 9, 2023, 8 Pages.
Office Action Received for European Application No. 20751339.1, mailed on Dec. 7, 2023, 2 pages.

* cited by examiner

*Primary Examiner* — Hang Pan
(74) *Attorney, Agent, or Firm* — ArentFox Schiff LLP (57) ABSTRACT

Examples described herein generally relate to performing conformance testing of a computational operation. A reference result including one or more reference intermediate products and a reference accumulator output at a first level of precision can be generated for the computational operation and based on one or more inputs. A hardware result can similarly be created using hardware at a second level of precision. The reference result can be compared to the hardware result to determine a variance value. A conformance result can be output based on whether the variance value is within a threshold range.

20 Claims, 3 Drawing Sheets

TECHNIQUES FOR CONFORMANCE TESTING COMPUTATIONAL OPERATIONS

CLAIM OF PRIORITY UNDER 35 U.S.C. § 119

The present application is a continuation of U.S. patent application Ser. No. 16/523,732, entitled "TECHNIQUES FOR CONFORMANCE TESTING COMPUTATIONAL OPERATIONS," filed on Jul. 26, 2019, which is assigned to the assignee hereof, and incorporated herein by reference in its entirety.

BACKGROUND

Use of computing devices is becoming more ubiquitous by the day. Computing devices range from standard desktop computers to wearable computing technology and beyond. One area of computing devices that has grown in recent years is in the context of machine learning (ML). ML typically involves generating a model that can be trained to provide some output based on one or more received inputs. Hardware for use in computing devices, such as graphics processing units (GPUs), can be developed to support certain ML operations, such as ML for performing voice recognition, facial recognition, etc., where an input of voice audio, facial image, etc. can produce an identification result.

ML operations can include computational operations, such as convolution. Different hardware vendors may use different algorithms to perform the computational operations, and as such, output from an ML operation based on a set of inputs may vary between hardware. In convolution, for example, a hardware vendor may implement the convolution operation based on performing summations in a certain order that may be ordered differently than a convolutional operation implemented by another hardware vendor.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for performing conformance testing of a machine learning (ML) computational operation configured to be implemented in a graphics processing unit (GPU) wherein the ML computational operation is performed by an algorithm specific to a hardware device is provided. The method includes determining, for the ML computational operation, one or more inputs for performing the conformance testing, wherein the one or more inputs results in one or more reference intermediate products of the ML computational operation being within one or more ranges, generating, for the ML computational operation and based on the one or more inputs, a reference result including one or more reference intermediate products and a reference accumulator output at a first level of precision, generating, for the ML computational operation and based on specifying the one or more inputs and a second level of precision to the GPU, a result for the hardware device including one or more hardware intermediate products and a hardware accumulator output using the GPU at the second level of precision, comparing the reference result to the generated result to determine a variance value, and outputting a conformance result based on whether the variance value is within a threshold range.

In another example, a computing device for performing conformance testing of a ML computational operation configured to be implemented in a GPU wherein the ML computational operation is performed by an algorithm specific to a hardware device is provided. The computing device includes a memory storing one or more parameters or instructions for developing an application, and at least one processor coupled to the memory. The at least one processor is configured to determine, for the ML computational operation, one or more inputs for performing the conformance testing, wherein the one or more inputs results in one or more reference intermediate products of the ML computational operation being within one or more ranges, generate, for the ML computational operation and based on the one or more inputs, a reference result including one or more reference intermediate products and a reference accumulator output at a first level of precision, generate, for the ML computational operation and based on specifying the one or more inputs and a second level of precision to the GPU, a result for the hardware device including one or more hardware intermediate products and a hardware accumulator output using the GPU at the second level of precision, compare the reference result to the generated result to determine a variance value, and output a conformance result based on whether the variance value is within a threshold range.

In another example, a non-transitory computer-readable medium including code executable by one or more processors for performing conformance testing of a ML computational operation configured to be implemented in a GPU wherein the ML computational operation is performed by an algorithm specific to the hardware device is provided. The code includes code for determining, for the ML computational operation, one or more inputs for performing the conformance testing, wherein the one or more inputs results in one or more reference intermediate products of the ML computational operation being within one or more ranges, generating, for the ML computational operation and based on the one or more inputs, a reference result including one or more reference intermediate products and a reference accumulator output at a first level of precision, generating, for the ML computational operation and based on specifying the one or more inputs and a second level of precision to the GPU, a result for the hardware device including one or more hardware intermediate products and a hardware accumulator output using the GPU at the second level of precision, comparing the reference result to the generated result to determine a variance value, and outputting a conformance result based on whether the variance value is within a threshold range.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to performing conformance testing of computational operations for hardware devices. In an example, for a given computational operation, a reference result for the operation can be generated from a set of one or more inputs and based on a first level precision, and a hardware result for the operation can be generated from the set of one or more inputs and based on a second level of precision using the hardware device. The reference result can be compared to the hardware result to determine an invariance value, which may be used to determine conformance of the hardware (e.g., based on determining whether the invariance value is within a threshold invariance). For a convolution operation, for example, this process can be performed for multiple sets of inputs, and the results may include associated intermediate products, an accumulation of the products, and a corresponding output result. Thus, for a convolution operation, reference results can be defined to include each of the associated reference intermediate products, an accumulation of the reference intermediate products, and a corresponding reference accumulator output result. Similarly, for a convolution operation, hardware results can be defined to include each of the associated hardware intermediate products, an accumulation of the hardware intermediate products, and a corresponding hardware accumulator output result. In any case, each hardware result can be compared to the corresponding reference result to determine conformance of the hardware.

In an example, the set of inputs for conformance testing the convolution operation can be chosen such that intermediate products being summed as part of the convolution operation fall within a narrow range of values. This can effectively remove variation in error that may be caused by summation order for the convolution operation, which may vary across hardware devices. For example, the set of inputs may be selected based on various possible floating point exponents to achieve one or more desired levels of error variation for the results. In another example, conformance tests can be performed based on various configurations of precision for inputs, intermediate products, accumulations, and outputs for the convolution operation to determine which configurations a hardware device can support based on the corresponding conformance test.

By controlling the set of inputs in this regard, a stricter error tolerance can be imposed as part of the conformance testing, as opposed to tests with larger variance in inputs and/or with inputs that result in larger disparity in corresponding generated intermediate products. Said differently, controlling the set of inputs as described herein can allow for numerical stability when performing conformance testing for machine learning operations, which can yield numerically similar testing results across different hardware devices. This can ensure certified hardware devices exhibit similar ML output results with lesser variance.

Figure 1:
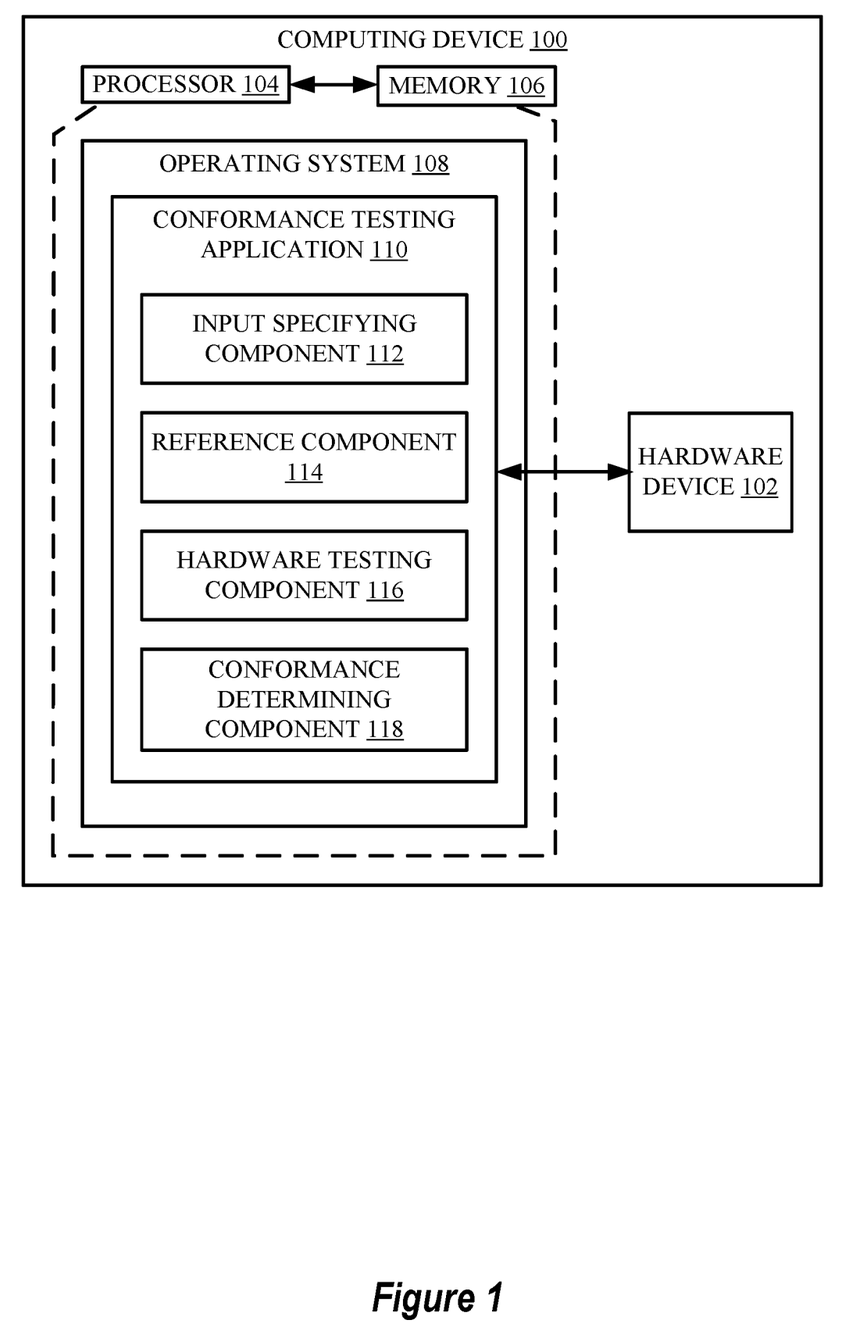
FIG. 1 is a schematic diagram of an example of a computing device for performing conformance testing for a hardware device in accordance with examples described herein.
Figure 2:
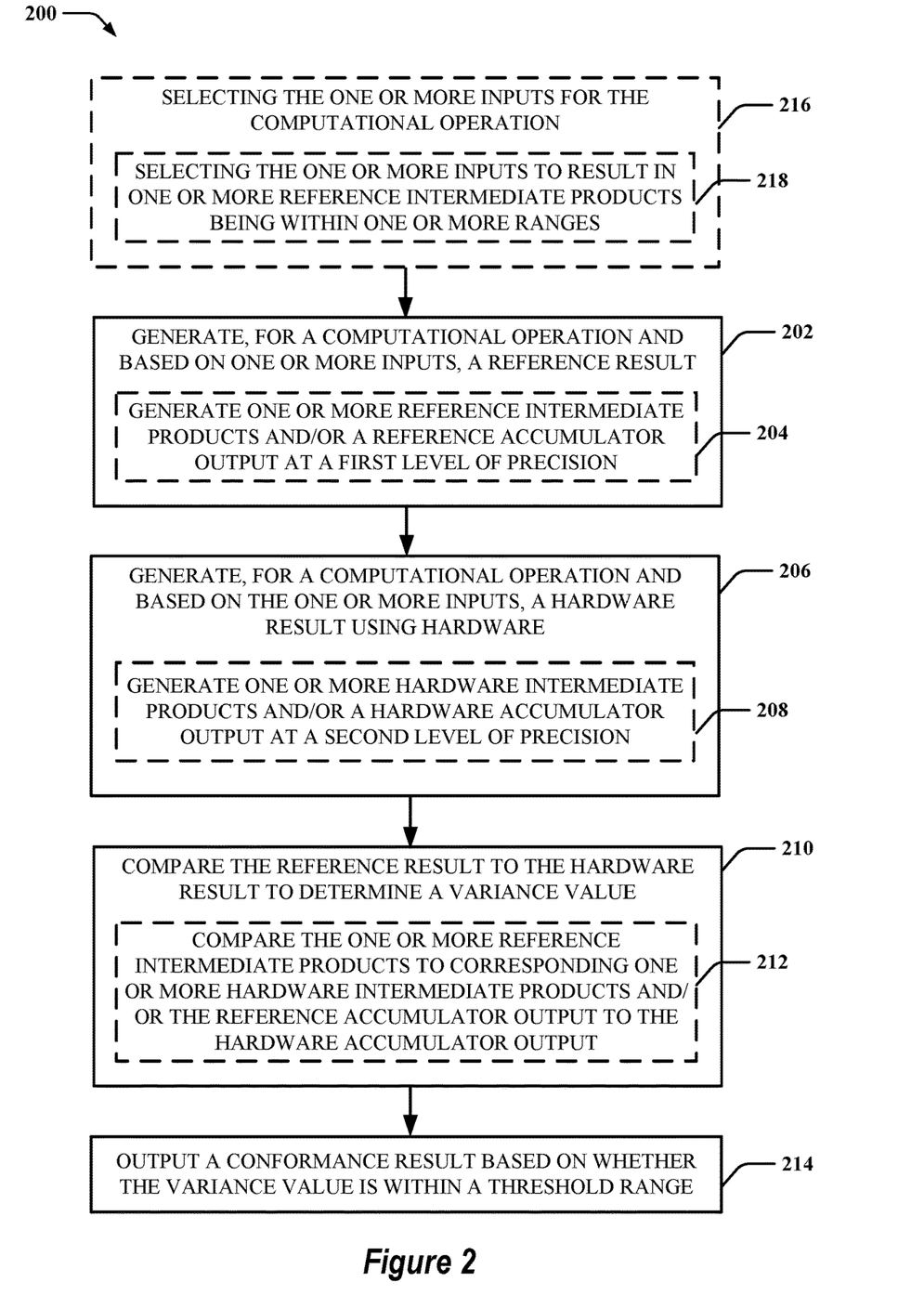
FIG. 2 is a flow diagram of an example of performing conformance testing for a hardware device in accordance with examples described herein.
Figure 3:
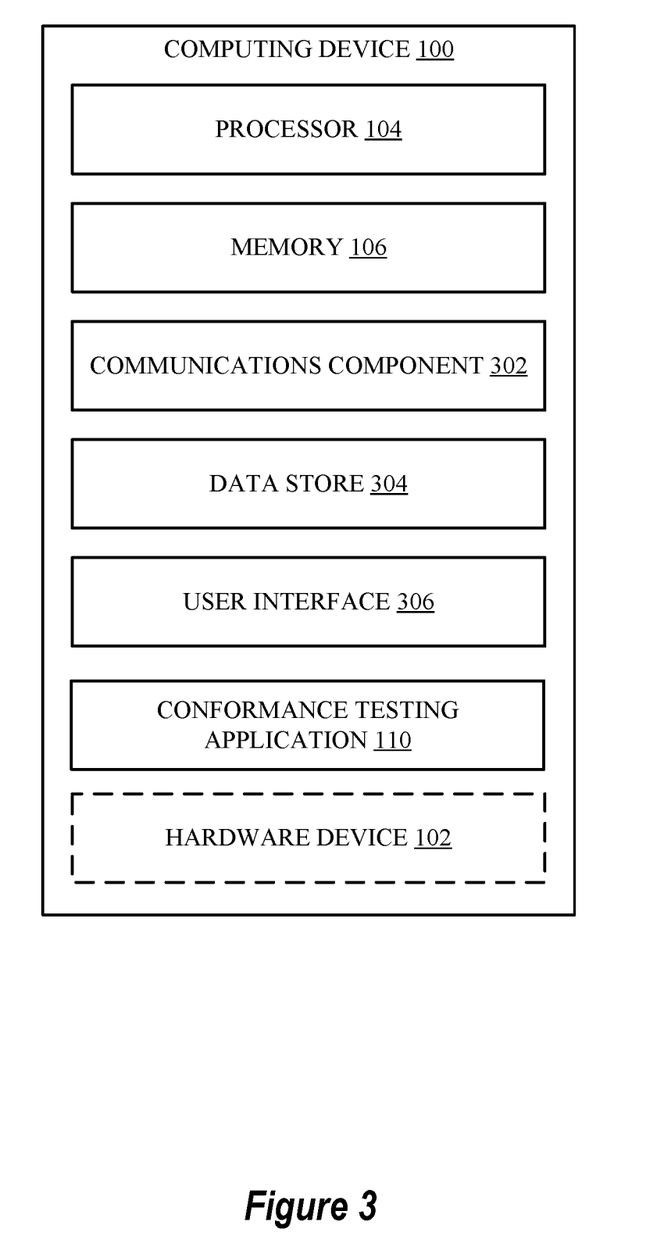
FIG. 3 is a schematic diagram of an example of a computing device for performing functions described herein.

Turning now to FIGS. 1-3, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for conformance testing a hardware device 102 in accordance with aspects described herein. The hardware device 102 may include one or more devices that can perform computational operations, such as a processor (e.g., central processing unit (CPU), graphics processing unit (GPU), system-on-chip (SoC), etc.) that can be attached to or otherwise within the computing device 100. In one example, the hardware device 102 may be coupled with the computing device via a bus that is internal to or external to the computing device. In an example, the hardware device 102 may be capable of performing computational operations including machine learning (ML) operations to provide certain functionality. In one example, the hardware device 102 may be a GPU capable of performing facial recognition based running one or more facial image inputs into a ML model to obtain a facial recognition output, an audio processor capable of performing voice recognition based on running one or more audio inputs into an ML model to obtain a voice recognition output, and/or the like. In an example, the hardware device 102 can perform a convolution operation as part of using the ML model to obtain outputs.

In an example, computing device 100 can include or can otherwise be coupled with a processor 104 and/or memory 106, where the processor 104 and/or memory 106 can be configured to execute or store instructions or other parameters related to performing conformance testing of the hardware device 102, as described herein. Computing device 100 can execute an operating system 108 (e.g., via processor 104 and/or memory 106) for providing an environment for executing one or more applications. In one example, the operating system 108 can include a device driver to communicate with hardware device 102. The operating system 108 can execute a conformance testing application 110 that can be used to test conformance of the hardware device 102 and output a conformance result, a measure of invariance from conformance criteria, and/or the like.

In an example, conformance testing application 110 can include an input specifying component 112 for generating a set of one or more inputs to use in performing conformance testing on one or more computational operations that the hardware device 102 can perform, a reference component 114 for generating, using the set of one or more inputs, a reference result for a computational operation based on a first level of precision, a hardware testing component 116 for testing, using the set of one or more inputs, the hardware device 102 to generate a hardware result of the computational operation, and/or a conformance determining component 118 for comparing the hardware result to the reference result to determine whether the hardware device 102 is conformant within a threshold range of invariance.

For example, conformance testing application 110 can provide a hardware agnostic software platform that can support execution of computation workloads on a wide variety of underlying hardware devices and can ensure that the execution of the workloads are sufficiently invariant to the hardware that is determined to be in conformance. The invariance can be ensured through the use of conformance testing application 110, which can broadly test supported computational workloads on each supported hardware platform or device, comparing the results to a reference standard, and determining that the reference standard is met. Some computational workloads, such as convolution, can be mathematically well-defined, such that given some input, the outputs that the operation produces can well-defined by a set of corresponding mathematical operations. If the outputs are computed using an effectively infinite precision, reference component 114 can determine a single reference result. In practice, the computation of the result using the effectively infinite precision may be impractical, and thus, for example, reference component 114 can use finite precision, which can introduce error in the output results. The sources of the error come from the limited precision of the individual operations, the limited precision of intermediate results (e.g., in a convolution operation) and the order in which the operations are performed.

To establish a reference standard, conformance testing application 110 can provide hardware flexibility while still maintaining sufficient bounds on the allowed error to ensure the computation is still mathematically stable using the concepts described herein. For example, conformance testing application 110 can allow, by setting the reference standard, for possible difference in the order of mathematical operations performed by a hardware device 102 and possibly different mathematical reductions to basic operations while still maintaining that the operations are done with sufficient precision to maintain output stability. For instance, conformance testing application 110 can select or otherwise utilize input values for a set of one or more inputs into the reference component 114 or hardware testing component 116 that allow for such flexibility in mathematics and maintaining the output stability, as described further herein.

FIG. 2 is a flowchart of an example of a method 200 for performing conformance testing of computational operations of a hardware device. For example, method 200 can be performed by the computing device 100, and is accordingly described with reference to FIG. 1, as a non-limiting example of an environment for carrying out method 200.

In method 200, at action 202, a reference result can be generated for a computational operation and based on one or more inputs. In an example, reference component 114, e.g., in conjunction with processor 104, memory 106, conformance testing application 110, etc., can generate, for the computational operation and based on the one or more inputs, the reference result. For example, reference component 114 can perform the computational operations based on the set of one or more inputs to determine an output. Reference component 114 can perform the computational operation using conformance testing application 110 software (e.g., executed via processor 104), without performance optimization of hardware device 102, to achieve an independent reference result for testing against a similar computational operation performed by hardware device 102.

In one example, in generating the reference result at action 202, optionally at action 204, one or more reference intermediate products and/or a reference accumulator output can be generated at a first level of precision. In an example, reference component 114, e.g., in conjunction with processor 104, memory 106, conformance testing application 110, etc., can generate the one or more reference intermediate products and/or the reference accumulator output at the first level of precision. For example, for a convolution operation, given a set of one or more inputs, multiple intermediate dot products can be generated based on applying the set of one or more inputs to an ML model. In addition, for the convolution operation, the multiple intermediate dot products can be accumulated into an accumulator output. Thus, reference results can be generated for various steps of the convolution operation in the form of each (or one or more of the) intermediate products and the accumulator output. In addition, reference component 114 can generate the reference intermediate outputs and/or accumulator output at the first level of precision. As described, the first level of precision can be an infinite or double precision. In an example, the first level of precision can be higher than a second level precision used in generating a hardware result, as described below, such that any deviation (e.g., error) in its result for some calculation can be significantly smaller than a unit of least precision of the final result when calculated at the second level of precision. The result at the first level of precision can be as precise as it can be when converted to a reference result at the second level of precision. Using double precision as the first level of precision, for example, can allow for achieving this criteria when the second level of precision is single or half.

In method 200, at action 206, a hardware result using hardware can be generated for a computational operation and based on one or more inputs. In an example, hardware testing component 116, e.g., in conjunction with processor 104, memory 106, conformance testing application 110, etc., can generate, for the computational operation and based on the one or more inputs, the hardware result using hardware (e.g., using hardware device 102). For example, hardware testing component 116 can perform the computational operations using hardware device 102 and based on the set of one or more inputs to determine an output. Hardware device 102 can perform the computational operation based on the set of one or more inputs and can provide the output and/or intermediate step results to the hardware testing component 116.

In one example, in generating the hardware result at action 206, optionally at action 208, one or more hardware intermediate products and/or a hardware accumulator output can be generated at a second level of precision. In an example, hardware testing component 116, e.g., in conjunction with processor 104, memory 106, conformance testing application 110, etc., can generate the one or more hardware intermediate products and/or a hardware accumulator output at the second level of precision. For example, for the convolution operation, given a set of one or more inputs, the hardware device 102 can generate multiple intermediate dot products based on applying the set of one or more inputs to an ML model, and may provide the intermediate dot product results to the hardware testing component 116 (e.g., based on the hardware testing component 116 requesting convolution be performed by the hardware device 102 based on the set of one or more inputs). In addition, for the convolution operation, hardware device 102 can accumulate the multiple intermediate dot products into an accumulator output, which it can also provide to the hardware testing component 116. Thus, hardware results can be also generated for various steps of the convolution operation in the form of each (or one or more of the) intermediate products and the accumulator output.

In addition, hardware testing component 116 can cause the hardware device 102 to generate the hardware intermediate outputs and/or accumulator output at the second level of precision, which may be less than the first level of precision based on including performance optimizations of the hardware device 102. In one example, hardware testing component 116 can cause the hardware device 102 to generate the hardware intermediate outputs and/or accumulator output at multiple levels of precision, where the levels of precision can be specified for the set of one or more inputs, the intermediate products, the accumulator, and/or the output. In an example, as described further herein, the levels of precision and/or combinations of different levels may correspond to different configurations that may be supported by the hardware device 102, and hardware testing component 116 can execute the conformance testing for each of the configurations based on the levels of precision to determine configurations that conform to threshold invariances.

In method 200, at action 210, the reference result can be compared to the hardware result to determine a variance value. In an example, conformance determining component 118, e.g., in conjunction with processor 104, memory 106, conformance testing application 110, etc., can compare the reference result to the hardware result to determine the variance value. For example, conformance determining component 118 can determine the variance value as a difference between the reference values and hardware values (e.g., as an absolute value).

In comparing the results at action 210, optionally at action 212, the one or more reference intermediate products can be compared to a corresponding one or more hardware intermediate products and/or the reference accumulator output can be compared to the hardware accumulator output. In an example, conformance determining component 118, e.g., in conjunction with processor 104, memory 106, conformance testing application 110, etc., can compare the one or more reference intermediate products to the corresponding one or more hardware intermediate products and/or the reference accumulator output to the hardware accumulator output. For example, at least for a convolution operation, conformance determining component 118 can determine the variance value for each of the intermediate products and/or the accumulator output in this regard.

In an example, conformance testing application 110 can output the conformance result based on whether the variance value is within the threshold range. For example, conformance testing application 110 can determine whether the variance value of each of the intermediate products and/or the accumulator output are within an acceptable range (e.g., whether the absolute value of a difference between the reference value and the hardware value is less than a threshold). If so, conformance testing application 110 may determine the hardware device 102 is in conformance of the computational operation (e.g., convolution), and may output an indication of conformance. Where, however, conformance testing application 110 determines that one or more (or a certain portion or certain ones) of the variance values are not in conformance, conformance testing application 110 may determine the hardware device 102 to not be in conformance for the computational operation, and may output an indication of non-conformance.

In method 200, optionally at action 216, the one or more inputs for the computational operation can be selected. In an example, conformance testing application 110, e.g., in conjunction with processor 104, memory 106, etc., can select the one or more inputs for the computational operation (e.g., to provide to reference component 114 and hardware testing component 116 for testing the operation). As described, for example, selection of inputs in this regard can be used or determined such to minimize impact of differing order of mathematical operations (e.g., order of summations of dot products), differing mathematical reductions to basic operations, etc. For example, the dot product is the summation of products, and the order of summation can vary based on hardware implementation. To reduce or eliminate the impact of this hardware based variation, inputs can be selected such that the products being summed fall within a narrow range of values and thus removing variation in the final error bound based on algorithmic choice of summation order. In addition, hardware device 102 can allow for selecting a precision to use in representing the intermediate product values and the precision to use during accumulation of these products. Selection of inputs and how to calculate the expected error bound can vary based on these choices.

For example, in selecting the one or more inputs at action 216, optionally at action 218, the one or more inputs can be selected to result in one or more reference intermediate products being within one or more ranges. In an example, conformance testing application 110, e.g., in conjunction with processor 104, memory 106, etc., can select the one or more inputs to result in one or more reference intermediate products being within one or more ranges. For example, ensuring the one or more reference intermediate products are within the one or more ranges can mitigate impacts caused by differences in order of performing or summing the intermediate products. For example, conformance testing application 110 can vary convolution inputs uniformly within a narrow range such that the products of the input fall uniformly within the range of a single floating point exponent (e.g., where all values within the range are within a same single floating point exponent). For instance, conformance testing application 110 can set all the inputs such that they fall between 1.0 and the square root of 2.0 (e.g., all values with floating point exponent of zero). This can cause the products of these inputs to fall within the range of 1.0 and 2.0 with an average of 1.5.

In addition, for example, conformance testing application 110 can perform conformance testing for hardware device 102 based on multiple sets of inputs, where each set of inputs may be based on a different range or range of exponents, such as exponent is zero, minimum exponent (de-normal range), maximal exponent, etc. In addition, conformance testing application 110 can target the number of product sums to some reasonable number that preserves enough precision in an accumulator of the hardware device 102 as accumulations occur (e.g., 64 product sums). Conformance testing application 110 can determine remaining convolution parameters appropriately in order that the number of product sums is around 64. Given the full definition of inputs to the convolution, reference component 114 can be used to generate the reference results using a software reference. The software reference can use the first level of precision in generating the reference results, as described (e.g., effectively infinite precision or Institute of Electrical and Electronics Engineers (IEEE) double precision for the products and the accumulator).

In addition, for example, hardware testing component 116 can execute the computational operation on the hardware device 102 based on multiple configurations, which may have varying precisions. For example, the precisions may correspond to IEEE floating point standards for representing floating point values as floating point numbers, i.e. floats, of certain precision (e.g., single precision floats and half precision floats). For example, to allow for hardware diversity, conformance testing application 110 can test multiple possible hardware configurations via hardware testing component 116 executing the computational operation on the hardware device 102, and reference component 114 can generate reference results for each configuration. In a specific example, conformance testing application 110 may test the following four configurations by specifying or otherwise utilizing the following levels of precision to represent values:

Configuration A: Single precision inputs, single precision intermediate products, single precision accumulator, and single precision output.

Configuration B: Half precision inputs, half precision intermediate products, half precision accumulator, and half precision output.

Configuration C: Half precision inputs, half precision intermediate products, full precision accumulator, and half precision output.

Configuration D: Half precision inputs, full precision intermediate products, full precision accumulator, and half precision output.

To determine the maximum allowable error given the input and hardware device 102 configuration, reference component 114 can determine the following values:

product_sums=64;

precision=10 (for half),23 (for single)

exponent=0,min and max min_val=pow(2.0f,exponent);

max_val=pow(2.0f,exponent);

avg_sum=((max_val+min_val)/2)*product_sums;

Based on the hardware configuration, reference component 114 can determine the max_error as described below. For Configuration A and Configuration B, reference component 114 can then calculate the maximum allowed error for each individual output result can then be calculated as follows:

sum_exponent=log 2(avg_sum);

ulp=pow(2.0f,sum_exponent−precision);

max_error=(ulp/2)*sqrt(product_sums);

For Configuration C max_error calculation, the accumulator may not add any error to the overall computation, and error comes primarily from the accumulated errors from the products themselves, which are in half precision. The final conversion of the accumulator may also contribute to the final error. Thus, the max error in this case can be calculated as:

precision=10 ulp=pow(2.0f,−precision)

max_error=(ulp/2)*sqrt(product_sums+1)

For Configuration D max_error calculation, there may not be any error to come from the intermediate product calculation or the accumulator, and error is primarily introduced in the final conversion from single precision to half. Thus, the max error in this case can be calculated as:

precision=10 ulp=pow(2.0f,−precision)

max_error=(ulp/2)

Given the reference result, hardware testing component 116 can inspect the hardware device 102 by executing the computational operation based on corresponding levels of precision to determine which configuration(s) the hardware device 102 can conform within the max_error. For each supported configuration, hardware testing component 116 can request that hardware device 102 generate hardware results, as described above, based on the inputs (e.g., for one or more ranges of exponents) and based on the level of precision for the configuration. Conformance determining component 118 can compare the hardware-generated results to the reference results to determine conformance for each configuration. For example, for each element in the results, conformance determining component 118 calculate the error by taking the absolute value of the difference between the reference result and the hardware result. In one example, if any calculated error is greater than the calculated allowable max_error, then the hardware device 102 can be deemed to have failed the conformance test for the configuration. In one example, conformance testing application 110 can output an indication of conformance or non-conformance (e.g., via a user interface) for the hardware device 102, where the indication may be for a specific configuration, for overall use as a supported hardware device, etc.

FIG. 3 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as conformance testing application 110, and/or components thereof, one or more device drivers for devices (e.g., hardware device 102), etc., as described herein, and/or other components of the computing device 100.

Further, computing device 100 may include a communications component 302 that provides for establishing and maintaining communications with one or more other devices, parties, entities, etc. utilizing hardware, software, and services as described herein. Communications component 302 may carry communications between components on computing device 100, as well as between computing device 100 and external devices, such as devices located across a communications network and/or devices serially or locally connected to computing device 100. For example, communications component 302 may include one or more buses, and may further include transmit chain components and receive chain components associated with a wireless or wired transmitter and receiver, respectively, operable for interfacing with external devices. Communications component 302 may be used to couple computing device 100 with hardware device 102, whether hardware device 102 is internal or external to the computing device 100. Moreover, for example, communications component 302 can carry communications between conformance testing application 110, etc.

Additionally, computing device 100 may include a data store 304, which can be any suitable combination of hardware and/or software, that provides for mass storage of information, databases, and programs employed in connection with examples described herein. For example, data store 304 may be or may include a data repository for applications and/or related parameters not currently being executed by processor 104. In addition, data store 304 may be a data repository for an operating system, application, such as conformance testing application 110, and/or components thereof, etc. executing on the processor 104, and/or one or more other components of the computing device 100.

Computing device 100 may also include a user interface component 306 operable to receive inputs from a user of computing device 100 and further operable to generate outputs for presentation to the user (e.g., an interface of conformance testing application 110). User interface component 306 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 306 may include one or more output devices, a speaker, a haptic feedback mechanism, a printer, any other mechanism capable of presenting an output to a user, or any combination thereof.

Computing device 100 can also include a conformance testing application 110 for testing conformance of a hardware device, such as hardware device 102 that can be internal or external to computing device 100, as described.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for performing conformance testing of a machine learning (ML) computational operation performed by an algorithm specific to a hardware device, comprising:
    generating, for the ML computational operation and based on one or more inputs and using a processor and not the hardware device, a reference result including one or more reference intermediate products and a reference accumulator output at a first level of precision, wherein the one or more reference intermediate products of the ML computational operation are within one or more ranges including a range where all values within the range are within a same single floating point exponent;
    generating, for the ML computational operation and based on specifying, to the hardware device, the one or more inputs, a result for the hardware device including one or more hardware intermediate products and a hardware accumulator output by the hardware device at a second level of precision;
    and
    outputting a conformance result based on whether a variance between the reference result and the result is within a threshold range.

2. The computer-implemented method of claim 1, wherein the one or more ranges include a first range with an exponent of zero, a second range with a minimum exponent, and a third range with a maximum exponent, and wherein generating the reference result, generating the result, and comparing the reference result to the generated result are performed for each of the one or more ranges.

3. The computer-implemented method of claim 1, wherein the conformance result includes an indication of whether the generated result passes a conformance test.

4. The computer-implemented method of claim 1, wherein generating the reference result, generating the result, and comparing the reference result to the generated result are performed for multiple configurations for the ML computational operation to output conformance results for each of the multiple configurations.

5. The computer-implemented method of claim 4, wherein the multiple configurations include:
   a first configuration having a single precision to represent values of the one or more inputs, a single precision to represent values of the one or more hardware intermediate products, a single precision to represent values of an accumulator that generates the hardware accumulator output, and a single precision to represent values of the hardware accumulator output;
   a second configuration having a half precision to represent values of the one or more inputs, a half precision to represent values of the one or more hardware intermediate products, a half precision to represent values of an accumulator that generates the hardware accumulator output, and a half precision to represent values of the hardware accumulator output;
   a third configuration having a half precision to represent values of the one or more inputs, a half precision to represent values of the one or more hardware intermediate products, a full precision to represent values of an accumulator that generates the hardware accumulator output, and a half precision to represent values of the hardware accumulator output; and
   a fourth configuration having a half precision to represent values of the one or more inputs, a full precision to represent values of the one or more hardware intermediate products, a full precision to represent values of an accumulator that generates the hardware accumulator output, and a half precision to represent values of the hardware accumulator output.

6. The computer-implemented method of claim 1, wherein comparing the reference result to the generated result comprises comparing each of the one or more reference intermediate products to a corresponding one of the one or more hardware intermediate products and comparing the reference accumulator output to the hardware accumulator output to determine associated error values.

7. The computer-implemented method of claim 1, wherein the ML computational operation includes a convolution operation.

8. The computer-implemented method of claim 1, wherein the one or more inputs are in the range of 1.0 and a square root of 2.0.

9. The computer-implemented method of claim 1, wherein the hardware device includes one or more processors.

10. A computing device for performing conformance testing of a machine learning (ML) computational operation performed by an algorithm specific to a hardware device, comprising:
    at least one memory storing one or more parameters or instructions for developing an application; and
    at least one processor coupled to the at least one memory, wherein the at least one processor is configured to:
    generate, for the ML computational operation and based on one or more inputs and without using the hardware device, a reference result including one or more reference intermediate products and a reference accumulator output at a first level of precision, wherein the one or more reference intermediate products of the ML computational operation are within one or more ranges including a range where all values within the range are within a same single floating point exponent;
    generate, for the ML computational operation and based on specifying, to the hardware device, the one or more inputs, a result for the hardware device including one or more hardware intermediate products and a hardware accumulator output by the hardware device at a second level of precision; and
    output a conformance result based on whether a variance between the reference result and the generated result is within a threshold range.

11. The computing device of claim 10, wherein the one or more ranges include a first range with an exponent of zero, a second range with a minimum exponent, and a third range with a maximum exponent, and wherein the at least one processor is configured to generate the reference result, and generate the result, for each of the one or more ranges.

12. The computing device of claim 10, wherein the conformance result includes an indication of whether the generated result passes a conformance test.

13. The computing device of claim 10, wherein the at least one processor is configured to generate the reference result, and generate the result, for multiple configurations for the ML computational operation to output conformance results for each of the multiple configurations.

14. The computing device of claim 13, wherein the multiple configurations include:
    a first configuration having a single precision to represent values of the one or more inputs, a single precision to represent values of the one or more hardware intermediate products, a single precision to represent values of an accumulator that generates the hardware accumulator output, and a single precision to represent values of the hardware accumulator output;
    a second configuration having a half precision to represent values of the one or more inputs, a half precision to represent values of the one or more hardware intermediate products, a half precision to represent values of an accumulator that generates the hardware accumulator output, and a half precision to represent values of the hardware accumulator output;
    a third configuration having a half precision to represent values of the one or more inputs, a half precision to represent values of the one or more hardware intermediate products, a full precision to represent values of an accumulator that generates the hardware accumulator output, and a half precision to represent values of the hardware accumulator output; and
    a fourth configuration having a half precision to represent values of the one or more inputs, a full precision to represent values of the one or more hardware intermediate products, a full precision to represent values of an accumulator that generates the hardware accumulator output, and a half precision to represent values of the hardware accumulator output.

15. The computing device of claim 10, wherein the at least one processor is configured to output a conformance result based on comparing each of the one or more reference intermediate products to a corresponding one of the one or more hardware intermediate products and comparing the reference accumulator output to the hardware accumulator output to determine associated error values.

16. The computing device of claim 10, wherein the ML computational operation includes a convolution operation.

17. The computing device of claim 10, wherein the one or more inputs are in the range of 1.0 and a square root of 2.0.

18. The computing device of claim 10, wherein the hardware device includes one or more processors.

19. One or more non-transitory computer-readable media, comprising code executable by one or more processors for performing conformance testing of a machine learning (ML) computational operation performed by an algorithm specific to a hardware device, the code comprising code for:

generating, for the ML computational operation and based on one or more inputs and without using the hardware device, a reference result including one or more reference intermediate products and a reference accumulator output at a first level of precision, wherein the one or more reference intermediate products of the ML computational operation are within one or more ranges including a range where all values within the range are within a same single floating point exponent;

generating, for the ML computational operation and based on specifying, to the hardware device, the one or more inputs, a result for the hardware device including one or more hardware intermediate products and a hardware accumulator output by the hardware device at a second level of precision;

and outputting a conformance result based on whether a variance between the reference result and the result the variance value is within a threshold range.

20. The one or more non-transitory computer-readable media of claim 19, wherein the one or more ranges include a first range with an exponent of zero, a second range with a minimum exponent, and a third range with a maximum exponent, and wherein the code for generating the reference result generates the reference result for each of the one or more ranges, the code for generating the result generates the result for each of the one or more ranges, and the code for comparing the reference result compares the reference result to the generated result for each of the one or more ranges.

* * * * *